United States Patent Office 3,265,623
Patented August 9, 1966

3,265,623
ALCOHOL COMPOSITIONS CONTAINING CARBOXYSILOXANE DERIVATIVES AS CORROSION INHIBITORS AND PROCESS FOR INHIBITING CORROSION
Arthur N. Pines, Snyder, and Eugene A. Zientek, Kenmore, N.Y., assignors to Union Carbide Corporation, a corporation of New York
No Drawing. Filed Dec. 12, 1960, Ser. No. 75,096
17 Claims. (Cl. 252—75)

This invention relates to the use of organosiloxanes in inhibiting the corrosion of metals that are in contact with aqueous solutions. More particularly, this invention relates to the use of carboxyorganosiloxane derivatives as corrosion inhibitors, particularly in alcohol compositions that are adapted for use (as such or when diluted) as coolants in the cooling systems of internal combustion engines.

Anti-freeze compositions containing alcohols, especially ethylene glycol, are commonly mixed with the cooling water in the cooling systems of internal combustion engines in order to depress the freezing point of the water. The alcohols gradually decompose in the cooling systems to produce acidic products which lower the pH of the coolant. It has been found that in the cooling systems of internal combustion engines metallic surfaces in contact with such coolants become seriously corroded and that the corrosion becomes progressively worse as the pH of the coolant decreases. The decomposition of the alcohol, the lowering of the pH of the coolant, and the attendant corrosion of the metallic surfaces of the cooling system result in both a significant loss of alcohol through decomposition at low pH values and leakage in the cooling system.

Hence, considerable effort has been directed toward obtaining anti-freeze compositions that contain materials (corrosion inhibitors) which retard the corrosion of the cooling systems of internal combustion engines. It was also recognized that it would be most desirable if such inhibited anti-freeze compositions were single phase systems, since anti-freeze compositions containing two or more phases entail handling and dispensing problems in order to insure that the compositions as they reach the consumer contain the proper proportion of each phase.

Numerous anti-freeze compositions containing alcohols and inhibitors have been proposed to date. Such inhibitors include both organic materials and inorganic materials. Illustrative of the organic materials that have been used as inhibitors in anti-freeze compositions are: guanidine, citrates, coal tar derivatives, petroleum bases, thiocyanates, peptones, phenols, thioureas, tannin, quinoline, morpholine, triethanolamine, tartrates, glycol monoricinoleate, organic nitrites, mercaptans, organic oils, sulfonated hydrocarbons, fatty oils and soaps. Illustrative of the inorganic materials that have been used as inhibitors are: sulfates, sulfides, fluorides, hydrogen peroxide, the alkali metal chromates, nitrites, phosphates, borates, tungstates, molybdates, carbonates and silicates and alkali earth metal borates.

The various inhibited anti-freeze compositions proposed to date suffer from one or more disadvantages that limit their usefulness. Some are two phase compositions and so present handling and dispensing problems. Others contain inhibitors that do not adequately retard corrosion of any of the metals used in the cooling systems. Some contain inhibitors that inhibit the corrosion of some metals but are not particularly useful in inhibiting the corrosion of other metals. Still other disadvantages of known inhibited anti-freeze compositions are poor shelf life (e.g. tendency of alkali metal silicate inhibitors therein to gel and/or form precipitates on standing), pronounced tendency of the inhibitors to attack rubber hoses that are part of the cooling systems, excessive foaming of the coolants to which they are added, tendency of the alcohols to decompose excessively to produce acidic products and tendency of the inhibitors to lose their corrosion inhibiting properties when employed outside a narrow temperature range and/or when in use for prolonged periods.

It is an object of this invention to provide improved anti-freeze and coolant compositions for use in the cooling systems of internal combustion engines that contain inhibitors that retard the corrosion of all of the metals which are suitable for use in such cooling systems.

Other objects of this invention are to provide improved anti-freeze and coolant compositions for use in the cooling systems of internal combustion engines that are single phase, that do not decompose appreciably to produce acidic products which accelerate corrosion, that have good shelf-life, and that contain inhibitors which do not attack the rubber parts of the cooling system, which do not cause the coolant to which they are added to foam excessively, and which are useful over a wide temperature range even after prolonged periods of service in coolants.

The compositions of this invention are inhibited compositions comprising an alcohol, a silicon-free inorganic basic buffer, and, as an inhibitor, a corrosion-inhibiting amount of a water soluble and alcohol soluble siloxane that contains the group represented by the formula:

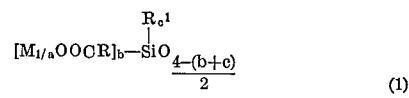

(1)

wherein M is a cation that imparts water and alcohol solubility of the siloxane; $a$ is the valence of the cation represented by M and has a value of at least one; R is an unsubstituted divalent hydrocarbon group or a divalent hydrocarbon group containing a $M_{1/a}OOC-$ group as a substituent; each $M_{1/a}OOC-$ group is connected to the silicon atom through at least two carbon atoms of the group represented by R; $R^1$ is a monovalent hydrocarbon group; $b$ has a value from 1 to 3 inclusive; $c$ has a value from 0 to 2 inclusive; and $(b+c)$ has a value from 1 to 3 inclusive. The anti-freeze compositions of this invention are anhydrous or contain, in addition to the alcohol and the siloxane inhibitor, a relatively small amount of water while the coolant compositions of this invention, contain, in addition to the alcohol and the siloxane inhibitor, a relatively large amount of water.

The siloxanes employed as corrosion inhibitors in the inhibited alcohol compositions of this invention can be composed solely of siloxane groups represented by Formula 1, or they can be composed of from 0.1 part to 99.9 parts by weight (per 100 parts by weight of the siloxane) of siloxane groups represented by Formula 1 and from 0.1 part to 99.9 parts by weight (per 100 parts by weight of the siloxane) of siloxane groups represented by the formula:

(2)

wherein $R''$ is an unsubstituted monovalent hydrocarbon group or an amino-substituted monovalent hydrocarbon group, and $e$ has a value from 1 to 3 inclusive. Lesser amounts of the siloxane groups represented by Formula 2 can be present in the siloxane if desired. These siloxanes can be linear, cyclic or cross-linked in structure and they contain at least 2 and up to from 100 to 1000 or more siloxane groups. Such siloxanes can contain from 10 to 90 parts by weight of groups represented by Formula 1 and from 10 to 90 parts by weight of groups represented by Formula 2.

The siloxanes that are generally preferred as corrosion inhibitors in the inhibited alcohol compositions of this invention are those composed both of groups represented by Formula 1 and Formula 2 which are present in the following amounts: from 50 parts to 85 parts by weight (per 100 parts by weight of the siloxane) of groups represented by Formula 1 and from 15 parts to 50 parts by weight (per 100 parts by weight of the siloxane) of groups represented by Formula 2.

Preferred inhibitors employed in the inhibited alcohol compositions of this invention are those containing groups represented by Formulae 1 and 2 wherein each $R^1$ group and any $R''$ groups each individually contain from 1 to 18 carbon atoms and wherein R contains from 2 to 18 carbon atoms.

Preferably the organosilicon inhibitors contain a $M_{1/a}OOC-$ group to silicon atom ratio of at least 1:25 and most desirably from 1:2 to 2:1. These organosilicon inhibitors, as contrasted with other organosilicon compounds (e.g. otherwise similar siloxanes having monovalent hydrocarbon groups in lieu of the $M_{1/a}OOCR-$ groups in Formula 1), were found to be characterized by their greater solubility in water and in alcohols, especially in ethanol. The solubility of these inhibitors is at least about 1 part by weight per 100 parts by weight of water or ethanol, but the most useful inhibitors are soluble to the extent of about 10 parts by weight per 100 parts by weight of water or ethanol.

The silicon atom in each group represented by Formulae 1 and 2 is bonded through at least one oxygen atom to another silicon atom. In addition to the substituents indicated in these formulae, some or all of the silicon atoms in the groups represented by Formulae 1 and 2 can be bonded to hydrogen atoms through oxygen (in which case the inhibitor contains the Si—OH group) and some or all of the silicon atoms in the groups represented by the Formulae 1 and 2 can be bonded to monovalent hydrocarbon groups through oxygen (in which case the inhibitors contain the Si—$OR^1$ groups). It should also be recognized that the $M_{1/a}OOC-$ groups in the groups represented by the Formula 1 can undergo equilibrium reactions with the water that is present in the preferred compositions of this invention. These reactions are illustrated, in the case of KOOC— groups, by the equation:

$$H_2O + KOOC \rightleftharpoons KOH + HOOC-$$

Especially useful organosilicon inhibitors are those wherein the group represented by Formula 1 is more specifically represented by the formula:

$$M^1OOCC_fH_{2f}SiO_{\frac{3-c}{2}}^{R_c^1} \quad (3)$$

wherein $M^1$ is sodium or potassium; f has a value of at least 2 and preferably has a value from 2 to 5; $R^1$ and c have the above-defined meanings and the $M^1OOC-$ group is connected to the silicon atom through at least two carbon atoms of the group represented by $-C_fH_{2f}-$.

The cations represented by M in Formula 1 that impart water and alcohol solubility to the siloxane inhibitors include cations that form water soluble hydroxides. Illustrative of such cations that form water soluble hydroxides are the various monovalent and polyvalent inorganic and organic cations that form water soluble hydroxides. Typical monovalent cations are alkali metal cations (e.g. the sodium, potassium, lithium and rubidium cations); and the tetraorgano ammonium cations [e.g. the tetra(alkyl) ammonium cations such as the tetra(methyl) ammonium cation, and the tetra(ethyl) ammonium cation; the tetra(mixed arylalkyl and mixed aralkyl-alkyl) ammonium cations such as the phenyltrimethyl ammonium cation and the benzyltrimethyl ammonium cation; and the tetra(hydroxyalkyl) ammonium cation such as the tetra(beta-hydroxyethyl) ammonium cation]. Typical of polyvalent cations are those produced by converting polyamines such as guanidine or ethylene diamine to polyammonium hydroxides. Illustrative of such polyvalent cations are $$^{(+)}H_3NC(:NH)NH_3^{(+)}$$

and $^{(+)}H_3N(CH_2)_2NH_3^{(+)}$. In the case of monovalent cations, the value of a in Formula 1 is one and, in the case of the polyvalent cations, the value of a in Formula 1 is at least 2 and preferably 2 or 3. The most preferred cations are sodium and, more especially, potassium.

Siloxanes containing groups represented by Formula 1 wherein M is a cation that renders the siloxane insoluble in water or alcohol are not useful as corrosion inhibitors in the inhibited alcohol compositions of this invention.

Illustrative of the unsubstituted divalent hydrocarbon groups represented by R in Formula 1 are the linear alkylene groups (for example, the trimethylene, $$-(CH_2)_3-$$

and the octadecamethylene, $-(CH_2)_{18}-$ groups), the arylene groups (for example, the naphthylene, $-C_{10}H_6-$ and para-phenylene, $-C_6H_4-$ groups); the cyclic alkylene groups (for example, the cyclohexylene, $-C_6H_{10}-$ group); the alkarylene groups (for example, the tolylene, $CH_3C_6H_3=$ group) and the aralkylene group (for example, the $-CH_2(C_6H_5)CHCH_2CH_2-$ group).

Illustrative of the divalent hydrocarbon groups containing a $M_{1/a}OOC-$ group as a substituent represented by R in Formula 1 are the following groups:

$$-CH_2CH(COONa)CH_2CH_2-$$
$$-CH_2CH_2CH_2CH(COOK)CH_2CH_2CH_2-$$

and $$-CH_2CH_2CH(CH_2CH_2COOK)CH_2CH_2-$$

Illustrative of the monovalent hydrocarbon groups represented by $R^1$ in Formula 1 and $R''$ in Formula 3 are the linear alkyl groups (for example, the methyl, ethyl, propyl, butyl and octadecyl groups), the cyclic alkyl groups (for example, the cyclohexyl and cyclopentyl groups), the linear alkenyl groups (for example, the vinyl and the butenyl groups), the cyclic alkenyl groups (for example, the cyclopentenyl and the cyclohexenyl groups), the aryl groups (for example, the phenyl and naphthyl groups), the alkaryl groups (for example, the tolyl group) and the aralkyl groups (for example, the benzyl and beta-phenylethyl groups).

Illustrative of the amino-substituted monovalent hydrocarbon groups represented by $R''$ in Formula 2 are the aminoalkyl groups (such as the gamma-aminopropyl, delta-aminobutyl, gamma-aminoisobutyl and epsilon-aminopentyl groups), the N-hydrocarbon-aminoalkyl groups (such as the N-methyl-gamma-aminoisobutyl groups and the N,N-diphenyl-delta-aminobutyl group) and the N-aminoalkyl-aminoalkyl groups (such as the N-beta-aminoethyl-gamma-aminopropyl and the N-gamma-aminopropyl-gamma-aminopropyl group).

Illustrative of the groups represented by Formula 1 are the groups having the formulae:

$$NaOOCCH_2CH_2C_6H_4SiO_{1.5}, \quad RbOOCCH_2C_6H_5\overset{C_6H_5}{\underset{CH_3}{Si}}O_{0.5}$$

$$(CH_3)_4NOOCC_6H_4CH_2CH_2\overset{CH_3}{\underset{}{Si}}O, \quad KOOCC_6H_4\overset{C_6H_5}{\underset{C_6H_5}{Si}}O_{0.5}$$

and $$LiOOC\overset{}{\underset{COOLi}{C}HCH_2CH_2CH_2SiO_{1.5}}$$

Illustrative of the groups represented by Formula 2 are the methylsiloxy, dimethylsiloxy, trimethylsiloxy, vinylsiloxy, diphenylsiloxy, methyldiphenylsiloxy, gamma-aminopropylsiloxy, gamma-aminoisobutylsiloxy, delta-aminobutylsiloxy, N-gamma-aminopropyl-gamma-aminopropylsiloxy, ($NH_2CH_2CH_2CH_2NHCH_2CH_2CH_2SiO_{1.5}$), and N-beta-aminoethyl-gamma-aminopropylsiloxy $$(NH_2CH_2CH_2NHCH_2CH_2CH_2SiO_{1.5})$$

groups.

The amount of the siloxane inhibitor present in inhibited alcohol compositions of this invention will vary widely from one application to another depending upon the temperature, type of metal or metals of which the cooling system is composed, type of alcohol in the composition, pH of the cooling water, velocity of the cooling water through the cooling system during operation, solutes (e.g. electrolytes such as chlorides, sulfates and bicarbonates) or other materials in the cooling water and prior treatment or corrosion of the metal. In general, corrosion inhibiting amounts of the siloxane inhibitor range from 0.1 part to 10 parts by weight per 100 parts by weight of the alcohol. Amounts of the siloxane inhibitor from 1.0 part to 5.0 parts by weight per 100 parts by weight of the alcohol are preferred. The above ranges are given to indicate the generally useful and preferred amounts of the siloxane inhibitor and may be departed from, though it is not usually desirable to do so since no advantage is gained thereby.

The alcohols that are useful in the inhibited alcohol compositions of this invention include both monohydric alcohols (such as methanol, ethanol and propanol) and polyhydric alcohols (such as ethylene glycol, diethylene glycol, triethylene glycol, propylene glycol and glycerol). These alcohols are water soluble and include hydrocarbon alcohols and alcohols containing ether linkages (e.g. $HOCH_2CH_2OCH_3$). Mixtures of alcohols are also useful in the compositions of this invention. In view of its desirable physical properties (such as its low molecular weight, its low volatility and the ready solubility of organosilicon inhibitors in its aqueous solutions), ethylene glycol is an especially useful alcohol in these compositions.

The compositions of this invention include both "concentrates" or anti-freezes (i.e. inhibited alcohol solutions containing no water or relatively small amounts of water) and "coolants" (i.e. inhibited alcohol solutions containing relatively large amounts of water). The concentrates or anti-freeze compositions are adapted to economical shipment and storage and the coolants are adapted to use, as such, as heat transfer media in the cooling systems of internal combustion engines. In practice, the concentrate can be shipped to the point where it is to be added to the cooling system and there it can be diluted to form a coolant. Water imparts desirable properties to both the concentrate and coolant compositions of this invention, e.g. small amounts of water serve to lower the freezing point of the concentrate compositions and large amounts of water impart good heat transfer properties to the coolant compositions. The compositions of this invention can contain from 0 part by weight to 900 parts by weight of water per 100 parts by weight of the alcohol. It is desirable that the coolant compositions contain from 30 parts to 900 parts by weight of water per 100 parts by weight of the alcohol. It is desirable that the concentrates or anti-freezes contain from 0.1 part to 10 parts by weight (or more desirably, from 2 parts to 5 parts by weight) of water per 100 parts by weight of the alcohol. In the latter case, the amount of water with which the concentrate compositions are mixed to provide a coolant should be such that the resulting coolant composition contains from 30 parts to 900 parts by weight of water per 100 parts by weight of the alcohol. The relative amount of water and alcohol in these compositions can be varied to lower the freezing point of the compositions by the desired amount. The pH of the inhibited aqueous alcohol compositions of this invention should be greater than seven to minimize corrosion of metals with which the compositions come into contact.

The inhibited alcohol compositions of this invention contain silicon-free basic buffers. These buffers serve to maintain the pH above 7 and preferably from 8 to 12, in order to minimize corrosion which increases with decreasing pH. Salts derived from (1) bases that are soluble in and appreciably ionized in water, and (2) acids that are soluble in and are not appreciably ionized in water are useful as buffers in the compositions of this invention. These bases and acids are usually denoted as strong bases and weak acids, respectively. Suitable buffers are silicon-free (i.e. they contain no silicon atoms). Salts derived from weak acids and strong bases, such as the hydroxides of the alkali metals (such as sodium, potassium and lithium) are especially useful although salts derived from weak acids and other bases (such as ammonium hydroxide) can also be employed. Salts derived from strong bases and acids such as boric, molybdic, phosphotungstic, phosphomolybdic, phosphoric, carbonic, tungstic, and arsenious acid are useful basic buffers. Such acids generally have $-\log K$ values (as given in the "Handbook of Chemistry," N. A. Lange, editor, pages 1229 to 1233, 8th edition, Handbook Publishers Inc., Sandusky, Ohio, 1952), of at least 1.8 and preferably at least 6.0. Illustrative of useful buffers are sodium and potassium carbonate, sodium phosphate, sodium molybdate, sodium phosphomolybdate, sodium phosphotungstate, sodium meta-arsenite, lithium molybdate, lithium borate, ammonium monohydrogen phosphate, sodium tungstate and the like. Preferred buffers are the sodium borates and potassium borates (e.g. sodium meta-borate and tetraborate and potassium meta-borate and tetraborate). Mixtures of these buffers are also useful in the compositions of this invention.

Calcium borate buffers (e.g. calcium meta-borate and calcium tetra-borate) are generally useful in the inhibited alcohol coolant compositions of this invention. Calcium borate buffers are particularly useful in those concentrate compositions of this invention where the inhibitor contains the group represented by Formula 2 wherein R" is an alkenyl group (e.g. compositions where the inhibitor is composed of equal numbers of $KOOCCH_2CH_2SiO_{1.5}$ groups and $CH_2=CHSiO_{1.5}$ groups). In other concentrate compositions, calcium borate buffers may cause the inhibitor to precipitate to a greater or lesser extent.

The amount of the silicon-free inorganic basic buffers used in the inhibited alcohol compositions of this invention depends to some extent upon its solubility, the shelf life of the composition containing the buffer, effectiveness of the particular buffer and similar factors. Generally, amounts of these buffers from 0.1 part to 10 parts by weight, or preferably from 0.5 part to 3 parts by weight, per 100 parts by weight of the alcohol are used in the composition of this invention. The use of lesser amounts of the buffer may result in a significant decrease in the pH of the coolant in a relatively short time whereas the use of greater amounts of the buffer may involve a needless cost and insolubility problems. No advantage is generally gained by departing from the indicated ranges.

The salts used as basic buffers in the inhibited alcohol compositions of this invention can be mixed as such with an alcohol and an organosilicon inhibitor in the formation of the compositions of this invention or, alternately, the corresponding bases and acids may be mixed and the salts formed in situ. By way of illustration, potassium borate can be used as such or, alternately, potassium hydroxide and boric acid may be used and the potassium borate formed in situ. As a further illustration, sodium molybdate can be used as such or, alternately, sodium hydroxide and molybdic acid can be used and the sodium molybdate formed in situ.

If desired, various additives can be added to the inhibited alcohol compositions of this invention in particular instances for imparting special properties. By way of illustration, anti-foam agents, identifying dyes, pH indicators, conventional inhibitors, sealants which prevent leakage of the coolant from the cooling system, anti-creep agents which prevent seepage of the coolant into the crankcase and the like can be added to the compositions of this invention.

The inhibited alcohol compositions of this invention can be formed in any convenient manner, e.g. by adding an alcohol, a siloxane inhibitor, water and a silicon-free inorganic basic buffer to a container and stirring the mixture.

The inhibited alcohol compositions of this invention inhibit the corrosion of metals that are suitable for use in the cooling systems of internal combustion engines. Such metals include the metals below sodium in the electromotive series (e.g. aluminum, iron, copper, chromium, nickel, lead, tin and zinc) as well as alloys of such metals (e.g. tin solder, brass, bronze and steel). Such metals are solids at 25° C. and normally become corroded when in prolonged contact with aqueous alcohol solution; particularly when the solutions are at elevated temperatures and/or contain electrolytes (e.g. acidic solutes). The compositions of this invention are particularly applicable to inhibiting corrosion of cooling systems composed of iron, brass and/or copper and the alloys of these metals.

The outstanding protection afforded to metals by the inhibitors present in the inhibited alcohol compositions of this invention is especially remarkable in view of the fact that alkali metal salts of aliphatic carboxylic acids are not particularly effective as corrosion inhibitors (e.g. potassium acetate was found to accelerate the corrosion of iron).

The siloxane inhibitors employed in the inhibited alcohol compositions of this invention can be produced by converting a siloxane containing the group represented by the formula:

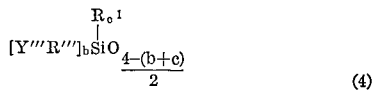
(4)

wherein $Y'''$ is a member selected from the group consisting of the HOOC—, cyano and $R^1OOC$— groups, $R'''$ is an unsubstituted divalent hydrocarbon group or a $Y'''$-substituted divalent hydrocarbon group, each group represented by $Y'''$ is connected to the silicon atom through at least two carbon atoms of the group represented by $R'''$, $b$ has a value from 1 to 3 inclusive, $R^1$ is a monovalent hydrocarbon group, $c$ has a value from 0 to 2 inclusive and $(b+c)$ has a value from 1 to 3 inclusive to the corresponding siloxane having the group represented by Formula 1. The starting siloxanes used in producing the inhibitors employed in the inhibited alcohol compositions of this invention can be composed solely of groups represented by Formula 4 or can be composed of one or more groups represented by Formula 4 and one or more groups represented by Formula 2. In the latter case, the inhibitor produced contains the group represented by Formula 2 in addition to the group represented by Formula 1.

When the group represented by Y in Formula 4 in the starting siloxane used in producing the siloxane inhibitor is a HOOC group or a $R^1OOC$ group, the conversion to the inhibitor is performed by reacting the starting siloxane and a suitable hydroxide (i.e. a hydroxide having the formula $M(OH)_a$ wherein M and $a$ have the above-defined meanings). The conversion can be performed by forming a mixture of the starting siloxane and the hydroxide and maintaining the mixture at a temperature from 20° C. to 100° C. The amount of the hydroxide employed is the stoichiometric amount required to convert at least some, but preferably all, of such Y groups in the siloxane to $M_{1/a}OOC$ groups.

When the group represented by Y in Formula 4 is a CN group, it is first converted to a HOOC— group by conventional hydrolysis methods. The HOOC— group is then converted to a $M_{1/a}OOC$— group by reaction with a suitable hydroxide.

One other process for producing the siloxane inhibitors employed in the inhibited alcohol compositions of this invention includes hydrolyzing a suitable cyano-organo-(hydrocarbonoxy)silane or carbohydrocarbonoxyorgano-(hydrocarbonoxy)silane in the presence of a basic catalyst to produce the corresponding carboxyorganosiloxane and then reacting the carboxyorganosiloxane and a suitable hydroxide of the above-described type. Both reactions can be performed in a single process step by forming a mixture of water, and a suitable hydroxide (i.e. $M(OH)_a$) and a silane represented by the formula:

(5)

wherein Y' is a cyano group or an $R^1OOC$ group, $R''''$ is an unsubstituted divalent hydrocarbon group or a Y' substituted divalent hydrocarbon group, each Y' group is separated from the silicon atom by at least 2 carbon atoms of the $R''''$ group, $R^1$, $b$, $c$, and $(b+c)$ have the above-defined meanings, and X is a hydrocarbonoxy group (e.g. such alkoxy groups as the methoxy, ethoxy, propoxy and butoxy groups and such aroxy groups as the phenoxy group) and maintaining the mixture at a temperature at which the water and the silane react to form a carboxyorganosiloxane and at which the siloxane so formed and the hydroxide react to produce the inhibitor.

Illustrative of the silanes represented by Formula 5 are: beta - cyanoethyltriethoxysilane, beta - cyanoethyl(methyl)diethoxysilane, gamma - cyanopropyl - diphenyl(propoxy)silane, beta - carbethoxyethyltriethoxysilane, beta - carbethoxyethyl(methyl)diethoxysilane, gamma-carbophenoxy - isobutyl - dibenzyl(phenoxy)silane and the like.

Silanes represented by the formula:

(6)

wherein X, R" and $e$ have the above-defined meanings can be mixed with water, a silane represented by Formula 5 and a suitable hydroxide and the mixture so formed can be heated to produce useful inhibitors containing groups represented by Formulae 1 and 2.

Illustrative of the silanes represented by Formula 6 are methyltriethoxysilane, dimethyldiethoxysilane, trimethylethoxysilane, vinyltriethoxysilane, benzyltripropoxysilane, phenyl(methyl)dipropoxysilane, phenyltriethoxysilane, diphenyldiethoxysilane,

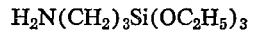

and $H_2NCH_2CH_2NH(CH_2)_3Si(OC_2H_5)_3$.

The silanes represented by Formulae 5 and 6 are partially converted to siloxane inhibitors by hydrolysis, condensation and salt formation reactions when mixed with water and a suitable hydroxide even at room temperature. Heating the mixture of the silane and water serves to complete the reaction. Distillation of the alcohol formed in the hydrolysis is usually performed to remove the alcohol to concentrate the siloxane.

The amount of water used in producing the inhibitors used in the compositions of this invention from the silanes represented by Formula 5 or from both silanes represented by Formulae 5 and 6 is at least that amount required to hydrolyze at least one group in each silane represented by X in Formulae 5 and 6. Amounts of water in excess of that amount required to hydrolyze all of the groups represented by X in Formulae 5 and 6 are usually preferred since it is generally desirable to have an excess of water present to serve as a medium within which the inhibitors can be formed. Thus, from 0.5 to 2000 moles of water per mole of the silanes represented by Formulae 5 and 6 are useful but from 25 moles to 70 moles of water per mole of the silanes represented by Formulae 7 and 8 are preferred.

The silanes and siloxanes employed in producing the inhibitors used in the inhibited alcohol compositions of this invention are generally known compounds that can be produced by known processes. Silane represented by Formula 5 can generally be produced by reacting an olefinically unsaturated mono- or di-nitrile or ester with a hydrogenhalosilane in the presence of a platinum catalyst to produce an adduct having one or two nitrile or ester groups and then reacting the adduct with an alcohol to replace the silicon-bonded halogen atoms with silicon-bonded hydrocarbonoxy groups, (e.g.

$$CH_3OOCCH_2C(COOCH_3)=CH_2$$

can be reacted with $HSiCl_3$ in the presence of a platinum catalyst to produce $CH_3OOCCH_2CH(COOCH_3)CH_2SiCl_3$ which can then be reacted with ethanol to produce $$CH_3OOCCH_2CH(COOCH_3)CH_2Si(OC_2H_5)_3$$

Alternately, a mono- or di-halo-organo-halosilane can be reacted with an alkali metal cyanide to produce a mono- or di-cyano-organo-halosilane which can then be reacted with an alcohol to produce the corresponding hydrocarbonoxy silane, (e.g. gamma-chloropropyltrichlorosilane can be reacted with potassium cyanide in a diethylformamide solvent to produce gamma-cyanopropyl-trichlorosilane which can then be reacted with ethanol to produce gamma-cyanopropyltriethoxysilane). The cyano groups of such silanes can be converted to ester groups by known processes. Silanes represented by Formula 6 where R″ is an N-amino-organo-N-amino-organo group can be produced by reacting a diamine and a halo-organo(hydrocarbonoxy)silane under anhydrous conditions with three moles of the diamine being present per mole of the silane at a temperature from 50° C. to 300° C., e.g. ethylene diamine can be reacted with gamma-chloropropyltriethoxysilane under the indicated conditions to produce.

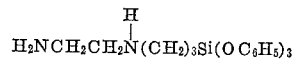

Since the inhibitors employed in the inhibited alcohol compositions of this invention can be formed in situ by merely adding a suitable silane or a mixture of suitable silanes and a suitable hydroxide to water, it is often advantageous to provide substantially anhydrous mixtures containing an alcohol, a silicon-free inorganic basic buffer, a suitable silane or mixture of silanes i.e. a silane represented by Formula 5 or a mixture of silanes represented by Formulae 5 and 6 and a suitable hydroxide. Such substantially anhydrous mixtures require a minimum amount of storage space and, when needed, such mixtures can be added to the cooling water of the cooling system of an internal combustion engine and the inhibitor will be formed in the coolant. The alcohol- and inhibitor-containing coolants so produced are compositions of this invention.

The inhibitors in the inhibited alcohol compositions of this invention do not attack the rubber hoses which are a part of the cooling systems of internal combustion engines, do not cause the alcohol to decompose significantly during long periods of use, do not cause coolants to foam excessively and are useful over a wide temperature range.

The inhibited alcohol compositions of this invention have good shelf lives. In addition, those compositions containing only an alcohol and the siloxane inhibitor or only water, an alcohol and the siloxane inhibitor are single phase compositions and hence they are free of the bulk handling and dispensing problems presented by two phase compositions. Of course, insoluble additives (e.g. insoluble sealants) can be added to the compositions of this invention if desired.

Although the inhibited alcohol compositions of this invention are particularly suitable for use (as such or when diluted with water) as coolants in the cooling systems of internal combustion engines, they can be advantageously employed in other applications. Thus, the coolant compositions of this invention can be employed as heat transfer media in all of the other instances where conventional inhibited aqueous alcohol compositions are commonly used as heat transfer media. The concentrate compositions of this invention can also be used as hydraulic fluids.

Although the utility of the above-described siloxane inhibitors has been set forth above in connection with the inhibition of the corrosion of metals that come in contact with aqueous alcohol compositions, the utility of such siloxanes is not limited to the protection of metals that come in contact with such compositions. On the contrary, these siloxanes are generally useful as corrosion inhibitors in any aqueous liquid which comes into contact with metals. Hence these siloxanes are admirably suited for use in the novel process of this invention for inhibiting the corrosion of metals that come into contact with aqueous liquids, which process involves adding to the liquid a corrosion inhibiting amount of the above-described siloxane inhibitors. For best results, a silicon-free inorganic basic buffer is added to the liquid along with the siloxane inhibitor.

Results equivalent to adding a siloxane inhibitor to an aqueous liquid in accordance with the process of this invention can be attained by adding to aqueous liquids, materials that react with water as described above to produce the siloxane inhibitor. Thus, the process of this invention can be conducted by adding to an aqueous liquid that comes in contact with a metal the following materials: (I) a mixture containing (a) siloxane composed solely of group represented by Formula 4 or of both groups represented by Formula 2 and Formula 4, and (b) a suitable hydroxide (i.e. a hydroxide having the formula $M(OH)_a$ wherein M and a have the above-described meaning); or (II) a mixture containing (a) a silane represented by Formula 5 or an admixture of a silane represented by Formula 5 and a silane represented by Formula 6 and (b) a suitable hydroxide [$M(OH)_a$].

In the practice of the process of this invention the siloxane inhibitor is added to an aqueous liquid (e.g. to water or an aqueous solution) and, for best results, the inhibitor is then uniformly dispersed throughout the liquid. Any suitable means can be used to disperse the inhibitor throughout the liquid. Thus, in the case of moving liquids that are in contact with the metal to be protected, the inhibitor employed in this invention can be added to the liquid while the liquid is in use and dispersion of the inhibitor throughout the liquid is achieved by the movement of the liquid. However, the inhibitor can be added to the liquid (prior to the use of the liquid in contact with the metal to be protected) and the inhibitor can be dispersed throughout the liquid by stirring the liquid. This latter procedure is preferred where the liquid is to be stored or where the liquid undergoes little movement when in use. These procedures allow the inhibitor to readily dissolve in the water or aqueous solution.

The process of this invention is generally applicable to the protection of metals that come into contact with liquids that contain water. Suitable liquids are pure water, aqueous solutions containing inorganic solutes and solutions containing water and water-soluble organic compounds, especially water-soluble or miscible organic liquids. Illustrative of suitable aqueous solutions containing inorganic solutes are aqueous sodium or potassium chloride refrigerating solutions, corrosive well water or river water containing normal chlorides, carbonates and sulfates which may be used as process or cooling water in industry, and the like. Illustrative of suitable solutions containing water and a water soluble organic liquid are solutions containing water and monohydric or polyhydric alcohols (e.g. methanol, ethanol, propanol, ethylene glycol, propylene glycol and glycerol), hydroxy and alkoxy endblocked polyalkylene oxides (such as polyethylene oxide), sulfoxides (such as methylsulfoxide), formamides (such as dimethylformamide) and cyclic ethers free of olefinic unsaturation (such as tetrahydrofuran, dioxane and the like). Suitable solutions containing water and a water soluble organic liquid should contain at least 0.1 part by weight, or preferably at least 5.0 parts by weight, of water per 100 parts by weight of the water and the organic liquid.

The process of this invention is generally applicable to the protection of metals and alloys that are suitable for use in industrial processes and apparatus. Metals whose corrosion is retarded by the process of this invention include the metals below sodium in the electromotive series (e.g. magnesium, aluminum, copper, chromium, iron, manganese, nickel, lead, silver, tin, beryllium and zinc) as well as the alloys of such metals (e.g. brass, bronze, solder alloys, steel and the like). Such metals are solids at 25° C. and normally become corroded when in prolonged contact with water, particularly when the water is at elevated temperatures and/or contains electrolytes (e.g. acidic solutes). The process of this invention is particularly applicable to the protection of brass, iron and copper. Those siloxanes containing both the groups represented by Formula 3 and the group represented by Formula 2 wherein at least one R″ group is a vinyl group are especially suited to the protection of aluminum.

The amount of the siloxane inhibitor employed in the process of this invention is dependent upon the factors mentioned above in connection with the amount of inhibitor used in the compositions of this invention. Generally, from 0.01 part per 10 parts by weight of the inhibitor per 100 parts by weight of the aqueous liquid to which the inhibitor is added are useful. Preferably from 0.5 part to 2.5 parts by weight of the inhibitor per 100 parts by weight of the aqueous liquid are used.

It is desirable to add a silicon-free inorganic basic buffer of the above-described type to the aqueous liquid along with the siloxane inhibitor in the practice of the process of this invention. From 0.1 part to 10 parts, but preferably from 0.5 part to 3.0 parts, by weight of the buffer per 100 parts by weight of the aqueous liquid can be used.

Compared with known processes for preventing corrosion of metals that are in contact with aqueous liquids, the process of this invention provides numerous advantages. Thus, the inhibitors used in the process of this invention can be added to a wide variety of aqueous solutions and inhibit a wide variety of metals. In addition, the inhibitors used in the process of this invention are effective over a wide temperature range and these inhibitors do not cause the liquids in which they are employed to foam excessively. Furthermore, these inhibitors do not promote the decomposition of organic compounds present in the liquid nor do they attack organic materials with which the liquid may come in contact.

The process of this invention is applicable to preventing the corrosion of metals that are cleaned by corrosive solutions or that are used in cooling coils, boilers, refrigeration and air conditioning equipment, heat exchange tubes, storage tanks for liquids, pipes, solvent containers, tank cars, ballast tanks containing sea water and the like. The process of this invention is particularly applicable to inhibiting the corrosion of the cooling systems of internal combustion engines in contact with aqueous alcohol coolant compositions.

The improvements in corrosion inhibition resulting from the use of the inhibited alcohol compositions and the process of this invention were found and evaluated by elaborate laboratory tests designed to simulate field conditions.

TWO-HUNDRED HOUR CORROSION TEST

This is a laboratory test which has proven over many years to be useful in evaluating inhibitors for use in aqueous alcohol anti-freeze solutions such as are used in the cooling systems of internal combustion engines. The test involves immersing clean strips of metal (usually iron, aluminum, brass and copper) and a brass coupon on which is a spot of solder, composed of 50 wt.-percent lead and 50 wt.-percent tin, in the test fluid with heating and aeration for a period of 200 hours. After this exposure, the specimens are cleaned and corrosion of the metal strips is measured by weight loss in milligrams. The corrosion of the spot of solder on the brass coupon is given a rating (called "solder spot rating," abbreviated SS in the examples) by visual inspection with a rating of 6 indicating little or no corrosion and a rating of 0 indicating very severe corrosion.

Each test unit consists of a 600 milliliter glass beaker equipped with a reflux condenser and an aeration tube. The test specimens are cut from 1/16-inch sheet stock usually with a total surface area of about nine (9) square inches. Test temperature is 100° C. and aeration rate is 0.028 cubic foot per minute. Specimens are separated with Z-shaped glass rods and are covered with 350 cc. of solution. The water used in preparing test solution is usually "corrosive water" which is water that has 100 parts per million added of each of bicarbonate, chloride, and sulfate ions as sodium salts. This gives an accelerated corrosion rate that simulates the corrosion rate that prevails when natural water is used to dilute anti-freeze compositions in actual practice. Duplicate tests are run simultaneously and both values or the average values of weight loss in milligrams, final pH and final RA (defined below) are given.

The "reserve alkalinity" of a composition is a measure of the ability of the composition to resist a decrease in pH due to the presence of acidic materials such as are produced by the presence of acidic materials such as are produced by the decomposition of alcohols. Reserve alkalinity (abbreviated RA in the examples) is determined by titrating a sample (about 10 milliliters) of the composition with 0.1 N aqueous hydrochloric solution. From the number of milliliters of the acid actually required to neutralize the sample, the number of milliliters of acid that would be required to neutralize 100 milliliters of the composition if it contained a water to alcohol ratio of 2:1 on a volume basis is computed and this latter number is the reserve alkalinity of the composition.

In the following examples, Br is used as an abbreviation for brass. All of the inhibited alcohol compositions of this invention described in the examples below were single phase compositions.

The following examples illustrate the present invention:

Example I

The 200-Hour Corrosion Test was run on several single phase inhibited alcohol compositions of this invention. These compositions contained 100 parts by weight of ethylene glycol and 180 parts by weight of water to which had been added 0.62 part by weight of a siloxane inhibitor composed of $KOOCCH_2CH_2SiO_{1.5}$ groups and the indicated silicon-free inorganic basic buffers. The results are shown in Table I.

TABLE I

| Buffer(s) | | pH | | RA [1] | | Wt. Loss (mg./9 sq. in.) | | SS [2] |
|---|---|---|---|---|---|---|---|---|
| Formula | Amount [3] | I [4] | F [5] | I | F | Fe | Br | |
| $K_2B_4O_7$ | 1.86 | 7.8 | 7.7 | 57 | 53 | 13 | 8 | 4.5 |
|  |  | 7.8 | 7.7 | 57 | 54 | 20 | 10 | 4.5 |
| $Na_2B_4O_7$ | 1.6 | 7.8 | 7.7 | 57 | 55 | 38 | 9 | 5 |
|  |  | 7.8 | 7.7 | 57 | 55 | 2 | 9 | 5.5 |
| $K_2MoO_7$ | 1.6 | 8.4 | 7.1 | 28 | 6 | 12 | 20 | 5.5 |
|  |  | 8.4 | 6.7 | 28 | 4 | 3 | 11 | 5.5 |
| $K_2MoO_4$ | 1.60 | 7.9 | 7.8 | 74 | 62 | 9 | 14 | 5.5 |
| $K_2B_4O_7$ | 1.86 | 7.8 | 7.8 | 74 | 69 | 12 | 12 | 5 |
| $NaBO_2$ | 1.18 | 9.5 | 8.5 | 57 | 49 | 36 | 23 | 5 |
|  |  | 9.5 | 8.5 | 57 | 50 | 38 | 23 | 5 |
| $KBO_2$ | 1.18 | 9.5 | 8.5 | 57 | 49 | 11 | 22 | 5 |
|  |  | 9.5 | 9.5 | 57 | 50 | 3 | 24 | 5 |

[1] Reserve alkalinity.
[2] Solder Spot Rating.
[3] Parts by weight per 100 parts by weight of the ethylene glycol.
[4] I denotes initial value.
[5] F denotes final value.

These results, when compared to the results shown in Table II where the results with test liquids containing silicon-free inorganic basic buffers but no siloxane inhibitor or neither a buffer nor an inhibitor are shown, demonstrate the improvement in iron, brass and solder protection obtained with the inhibited alcohol composition of this invention.

TABLE II

| Buffer(s) | | pH | | RA | | Wt. Loss (mg./9 in.$^2$) | | SS |
|---|---|---|---|---|---|---|---|---|
| Formula | Amount[1] | I | F | I | F | Fe | Br | |
| $K_2B_4O_7$ | 1.86 | 7.9 | 7.7 | 59 | 50 | 51 | 18 | 5 |
| | | 7.9 | 7.8 | 59 | 50 | 21 | 8 | 5 |
| $Na_2B_3O_7$ | 1.60 | 7.8 | 7.5 | 60 | 55 | 85 | 15 | 5 |
| $K_2MoO_4$ | 1.6 | 9.3 | 7.2 | 21 | 7 | 11 | 14 | 5 |
| | | 9.3 | 7.1 | 21 | 19 | 12 | 14 | 5 |
| $K_2MoO_4$ | 1.60 | 7.9 | 7.7 | 76 | 64 | 10 | 20 | 5 |
| $K_2B_4O_7$ | 1.86 | 7.9 | 7.8 | 76 | 62 | 20 | 20 | 5 |
| None | | 7.1 | 6.2 | 0 | 0 | 663 | 115 | 52 |

[1] Parts by weight per 100 parts by weight of the ethylene glycol.

*Example II*

The 200-Hour Corrosion Test was run on several single phase inhibited alcohol compositions of this invention containing 100 parts by weight of ethylene glycol and 200 parts by weight of water to which had been added the indicated pre-formed siloxane inhibitors. For comparison purposes, a similar aqueous glycol solution containing no inhibitor was also tested. The results are shown in Table III.

TABLE III

| Inhibitor | | pH | | Wt. Loss (mg./9 in.$^2$) | | | SS |
|---|---|---|---|---|---|---|---|
| Formula | Amount[1] | I | F | Fe | Br | Cu | |
| None | | 7.1 | 5.2 | 663 | 115 | 52 | 4.5 |
| $KOOCCH_2CH_2SiO_{1.5}$ [2] | 0.21 | 9.1 | 8.5 | 62 | 17 | 42 | 4.5 |
| $KOOCCH_2CH_2SiO_{1.5}$ and $CH_2=CHSiO_{1.5}$ [3] | 0.31 | 9.6 | 7.5 | 65 | 98 | 152 | 4.5 |
| | | | 7.7 | 40 | 58 | 100 | 4.5 |
| $KOOCCH_2CH_2Si(CH_3)O$ [2] | 0.22 | 8.7 | 8.8 | 284 | 25 | 39 | 4 |
| | | | 9.1 | 278 | 4 | 25 | 4.5 |
| $KOOC(CH_2)_2Si(CH_3)O$ [2] | 0.23 | 9.5 | 7.0 | 155 | 43 | 40 | 4 |
| | | | 5.8 | 633 | 90 | 107 | 4 |
| $KOOC(CH_2)_3Si(CH_3)SiO$ [2] | 0.23 | 9.6 | 7.9 | 313 | 14 | 21 | 4 |
| | | | 7.9 | 252 | 14 | 32 | 4 |
| $KOOC(CH_2)_3SiO_{1.5}$ [2] | 0.23 | 9.9 | 8.2 | 104 | 25 | 33 | 4.5 |
| | | | 8.1 | 110 | 23 | 30 | 4.5 |

[1] Parts by weight per 100 parts by weight of the ethylene glycol and water.
[2] Siloxane homopolymer composed only of groups having this formula.
[3] Siloxane copolymer composed of equal numbers of these two groups.

These results show the corrosion protection afforded metals by the siloxane inhibitors employed in the process of this invention. The results shown in Table I demonstrate that even greater protection is affoarded metals when a silicon-free inorganic basic buffer is employed along with the siloxane inhibitor.

*Example III*

In accordance with the process of this invention, siloxane inhibitors were added to a variety of aqueous liquids and the inhibited liquids so formed were tested in the 200-Hour Corrosion Test. The results are shown in Table IV.

The aqueous liquid tested in runs A1, A2, A3 and A4 was distilled water.

The aqueous liquid tested in runs B1, B2, B3 and B4 was composed of 33 percent by volume of methanol and 57 percent by volume of corrosive water (i.e. water containing 100 parts per million each of bicarbonate, chloride and sulfate ions as sodium salts).

The aqueous liquid tested in runs C1, C2, and C3 was composed of 33 percent by volume of dimethylformamide and 67 percent by volume corrosive water.

The aqueous liquid tested in runs D1, D2 and D3 was composed of 33 percent by volume of dimethylsulfoxide and 67 percent by volume of corrosive water.

TABLE IV

| Run | Inhibitor | | pH | | Wt. Loss (mg./9 sq. in.) | | | SS |
|---|---|---|---|---|---|---|---|---|
| | Formula | Amount[1] | I | F | Fe | Br | Cu | |
| A1 | No inhibitor | | 7.1 | 6.3 | 1,354 | 68 | 106 | 5 |
| | | | | 6.1 | 983 | 71 | 50 | 4.5 |
| A2 | $KOOCCH_2CH_2SiO_{1.5}$ | 0.21 | 7.5 | 6.8 | 2 | 9 | 12 | 5.5 |
| | | | | 7.0 | 3 | 8 | 13 | 5.5 |
| A3 | $NaOOCCH_2CH_2SiO_{1.5}$ | 0.19 | 8.8 | 8.1 | 2 | 7 | 8 | 6 |
| | | | | 8.1 | 1 | 7 | 7 | 6 |
| A4 | $KOOCCH_3$ | 0.12 | 8.3 | 8.5 | 2,042 | 15 | 14 | 5 |
| B1 | No inhibitor | | 8.2 | 10.2 | 479 | 7 | 18 | 6 |
| | | | | 9.5 | 393 | 15 | 87 | 5 |
| B2 | $KOOCCH_2CH_2SiO_{1.5}$ | 0.21 | 8.8 | 8.6 | 7 | 5 | 5 | 5.5 |
| | | | | 8.6 | 7 | 6 | 5 | 5.5 |
| B3 | $KOOC(CH_2)Si(CH_3)O$ | 0.23 | 8.1 | 10.2 | 245 | 12 | 14 | 5 |
| | | | | 10.2 | 233 | 8 | 11 | 5 |
| B4 | $NaOOC(CH_2)_3Si(CH_3)O$ | 0.21 | 9.3 | 9.7 | 419 | 15 | 17 | 5 |
| | | | | 10.3 | 201 | 6 | 10 | 5 |
| C1 | No inhibitor | | 7.9 | 6.6 | 1,168 | 100 | 50 | 4.5 |
| | | | | 6.8 | 1,047 | 96 | 50 | 4.5 |
| C2 | $KOOC(CH_2)_3Si(CH_3)O$ | 0.23 | 9.4 | 9.3 | 720 | 68 | 39 | 5 |
| | | | | 7.2 | 803 | 76 | 43 | 5 |
| C3 | $KOOCCH_2CH_2SiO_{1.5}$ | 0.2 | 7.6 | 6.6 | 833 | 57 | 54 | 4.5 |
| | | | | 6.9 | 646 | 64 | 57 | 5 |
| D1 | No inhibitor | | | 8.2 | 5.7 | 568 | 85 | | 4.5 |
| | | | | 5.8 | 696 | 75 | | 4.5 |
| D2 | $KOOCCH_2CH_2SiO_{1.5}$ | 0.21 | 8.8 | 9.5 | 503 | 36 | | |
| D3 | $NaOOCCH_2CH_2Si(CH_3)Of$ | 0.21 | 9.4 | 9.2 | | 51 | | 5 |
| | | | | 8.9 | | 41 | | 4.5 |

[1] Parts by weight per 100 parts by weight of the aqueous liquid.

The results show that corrosion protection is afforded metals that come into contact with a variety of aqueous liquids by the siloxanes employed as inhibitors in the process of this invention. The results in run A4 show that potassium acetate actually accelerates the corrosion of iron.

*Example IV*

The 200-Hour Corrosion Test was run on several inhibited ethylene glycol coolant compositions of this invention containing (1) 0.25 part by weight of a siloxane inhibitor composed of equal numbers of $$KOOCCH_2CH_2SiO_{1.5}$$

groups and $CH_2=CHSiO_{1.5}$ groups (2) potassium borate, (3) 180 parts by weight of water, and (4) 100 parts by weight of ethylene glycol. The borate buffers were formed in situ by mixing the indicated amounts of KOH and $H_3BO_3$ with the water and glycol. The results are shown in Table V.

TABLE V

| Buffer Composition [1] | | Mole Ratio, K:B | pH | | RA | | Weight Loss, mg./9 in.[2] | | | SS |
|---|---|---|---|---|---|---|---|---|---|---|
| KOH | H₃BO₃ | | I | F | I | F | Fe | Al | Br | |
| 3.00 | 2.50 | 1:0.75 | 12.2 | 10.4 | 190 | 153 | 1 | 0 | 4 | 5.5 |
|  |  |  |  | 9.8 |  | 150 | 1 | 0 | 5 | 5.5 |
| 3.00 | 3.30 | 1:1 | 9.7 | 9.4 | 188 | 186 | 1 | 0 | 10 | 5.5 |
|  |  |  |  | 9.3 |  | 185 | 1 | 0 | 8 | 5.5 |
| 3.00 | 4.13 | 1:1.25 | 8.3 | 8.5 | 189 | 188 | 6 | 0 | 11 | 5.5 |
|  |  |  |  | 8.5 |  | 190 | 1 | 0 | 12 | 5.5 |
| 3.00 | 4.95 | 1:1.50 | 8.2 | 8.3 | 189 | 188 | 1 | 0 | 17 | 5 |
|  |  |  |  | 8.3 |  | 189 | 1 | 0 | 15 | 5 |
| 3.00 | 5.78 | 1:1.75 | 8.0 | 8.1 | 185 | 184 | 1 | 1 | 21 | 5 |
|  |  |  |  | 8.1 |  | 186 | 2 | 1 | 23 | 5 |
| 3.00 | 6.60 | 1:1.2 | 7.9 | 7.9 | 187 | 187 | 4 | 2 | 31 | 5 |
|  |  |  |  | 7.9 |  | 184 | 2 | 4 | 24 | 5 |
| 3.00 | 8.26 | 1:2.5 | 7.7 | 7.7 | 185 | 179 | 1 | 8 | 20 | 5 |
|  |  |  |  |  |  | 180 | 2 | 6 | 20 | 5 |

[1] Parts by weight per 100 parts by weight of the glycol.

For comparison purposes otherwise identical tests were run without the siloxane inhibitor or without either a buffer or an inhibitor. These results are shown on Table VI.

TABLE VI

| Buffer Composition [1] | | Mole Ratio, K:B | pH | | RA | | Weight Loss, mg./9 in.[2] | | | SS |
|---|---|---|---|---|---|---|---|---|---|---|
| KOH | H₃BO₃ | | I | F | I | F | Fe | Al | Br | |
| 3.00 | 2.50 | 1:0.75 | 12.2 | 10.4 | 195 | 183 | 5 | 317 | 10 | 5 |
|  |  |  |  |  |  | 183 | 1 | 336 | 9 | 5 |
| 3.00 | 3.30 | 1:1 | 9.8 | 8.4 | 190 | 150 | 0 | 35 | 7 | 5.5 |
|  |  |  |  | 8.4 |  | 150 | 0 | 26 | 7 | 5 |
| 3.00 | 4.13 | 1:1.25 | 8.5 | 8.4 | 192 | 188 | 1 | 20 | 3 | 5 |
|  |  |  |  | 8.2 |  | 187 | 2 | 26 | 3 | 5 |
| 3.00 | 4.95 | 1:1.5 | 8.2 | 8.1 | 196 | 188 | 0 | 62 | 3 | 5 |
|  |  |  |  | 8.2 |  | 187 | 1 | 35 | 2 | 5 |
| 3.00 | 5.78 | 1:1.75 | 8.0 | 8.0 | 186 | 184 | 0 | 26 | 2 | 5 |
|  |  |  |  | 8.0 |  | 185 | 1 | 33 | 3 | 5 |
| 3.00 | 6.60 | 1:2 | 7.8 | 7.6 | 188 | 185 | 1 | 38 | 4 | 5 |
|  |  |  |  | 7.6 |  | 188 | 1 | 32 | 4 | 5 |
| 3.00 | 8.26 | 1:2.5 | 7.7 | 7.7 | 185 | 185 | 1 | 38 | 5 | 5 |
|  |  |  |  | 7.4 |  | 186 | 1 | 40 | 5 | 5 |
| None | None | --- | 7.1 | 6.2 | 0 | 0 | 663 | 10 | 115 | 4.5 |

[1] Parts by weight per 100 parts by weight of the glycol.

These comparative results demonstate the improvement in corrosion protection attained by employing a siloxane inhibitor in addition to a silicon-free inorganic basic buffer.

From the foregoing examples, it is seen that siloxanes containing from 10 to 90 parts by weight of groups represented by Formula 1 and from 10 to 90 parts by weight of groups represented by Formula 2 per 100 parts by weight of the siloxane are particularly effective corrosion inhibitors.

The phrases "monovalent hydrocarbon group" and "divalent hydrocarbon group" are used herein in their generic sense to include both unsubstituted and substituted groups.

What is claimed is:

1. An inhibited alcohol composition comprising an alcohol, a silicon-free inorganic basic buffer, said buffer being present in an amount from 0.1 part to 10 parts by weight per 100 parts by weight of alcohol and, as an inhibitor, a corrosion inhibiting amount of a water soluble and alcohol soluble siloxane consisting essentially of groups represented by the formula:

$$[M_{1/a}OOCR]_b\overset{R_c'}{\underset{|}{Si}}O_{\frac{4-(b+c)}{2}}$$

wherein M is a cation that imparts water and alcohol solubility to the siloxane, said cation being selected from a group consisting of the sodium, potassium, lithium and rubidium cations and the tetraorgano ammonium cations, $a$ is the valence of the cation represented by M and has a value of at least one, R is a divalent hydrocarbon group containing from 0 to 1 $M_{1/a}OOC$ groups as substituents, each $M_{1/a}OOC—$ group is connected to the silicon atom through at least 2 carbon atoms of the group represented by R; $R^1$ is a monovalent hydrocarbon group, $b$ has a value from 1 to 3 inclusive, $c$ has a valve from 0 to 2 inclusive, and $(b+c)$ has a value from 1 to 3 inclusive, said siloxane being present in an amount from 0.1 part to 10 parts by weight per 100 parts by weight of the alcohol.

2. The composition of claim 1 wherein the alcohol is ethylene glycol.

3. The composition of claim 1 wherein M is potassium and the buffer is a potassium borate.

4. The composition of claim 1 which contains, as an additional component, from 0.1 part to 10 parts by weight of water per 100 parts by weight of the alcohol.

5. A single phase inhibited alcohol composition comprising a glycol, a silicon-free inorganic basic buffer, said buffer being present in an amount from 0.1 part to 10 parts by weight per 100 parts by weight of the glycol, and, as an inhibitor, a corrosion inhibiting amount of a water soluble and alcohol soluble siloxane consisting essentially of groups represented by the formula

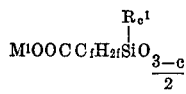

wherein $M^1$ is potassium, $f$ has a value of at least 2, $R^1$ is a monovalent hydrocarbon group, $c$ has a value from 0 to 2 inclusive and $M^1OOC-$ group is connected to the silicon atom through at least 2 carbon atoms of the group represented by $C_fH_{2f}$, said siloxane being present in an amount from 0.1 to 10 parts by weight per 100 parts by weight of the glycol.

6. A single phase inhibited ethylene glycol composition comprising ethylene glycol, from 0.1 part to 10 parts by weight of a potassium borate per 100 parts by weight of the ethylene glycol, from 0 part to 900 parts by weight of water per 100 parts by weight of the ethylene glycol and, as an inhibitor, from 0.1 part to 10 parts by weight per 100 parts by weight of the ethylene glycol of a water soluble and alcohol soluble siloxane consisting essentially of groups represented by the formula:

$$KOOCCH_2CH_2SiO_{1.5}$$

7. A single phase inhibited ethylene glycol composition comprising ethylene glycol, from 0.1 part to 10 parts by weight of a potassium borate per 100 parts by weight of the ethylene glycol, from 0 to 900 parts by weight of water per 100 parts by weight of the ethylene glycol and, as an inhibitor, from 0.1 part to 10 parts by weight per 100 parts by weight of the ethylene glycol of a water soluble and alcohol soluble siloxane consisting essentially of groups represented by the formula:

$$KOOCCH_2CH_2Si(CH_3)O$$

8. A single phase inhibited ethylene glycol composition comprising ethylene glycol, from 0.1 part to 10 parts by weight of a potassium borate per 100 parts by weight of the ethylene glycol, from 0 to 900 parts by weight of water per 100 parts by weight of the ethylene glycol and, as an inhibitor, from 0.1 part to 10 parts by weight per 100 parts by weight of the ethylene glycol of a water soluble and alcohol soluble siloxane consisting essentially of groups represented by the formula:

$$KOOC(CH_2)_3SiO_{1.5}$$

9. A single phase inhibited ethylene glycol composition comprising ethylene glycol, from 0.1 part to 10 parts by weight of a sodium borate per 100 parts by weight of the ethylene glycol, from 0 to 900 parts by weight of water per 100 parts by weight of the ethylene glycol and, as an inhibitor, from 0.1 part to 10 parts by weight of the ethylene glycol of a water soluble and alcohol soluble siloxane consisting essentially of groups represented by the formula:

$$NaOOCCH_2CH_2Si(CH_3)O$$

10. A single phase inhibited ethylene glycol composition comprising ethylene glycol, from 0.1 part to 10 parts by weight of a potassium borate per 100 parts by weight of the ethylene glycol, from 0 to 900 parts by weight of water per 100 parts by weight of the ethylene glycol and, as an inhibitor, from 0.1 part to 10 parts by weight per 100 parts by weight of the ethylene glycol of a water soluble and alcohol soluble siloxane consisting essentially of siloxane groups represented by the formula:

$$KOOC(CH_2)_3Si(CH_3)O$$

11. An inhibited alcohol composition comprising an alcohol, from 0.1 part to 10 parts by weight of a silicon-free inorganic basic buffer per 100 parts by weight of the alcohol, and, as an inhibitor, a corrosion inhibiting amount of a water soluble and alcohol soluble siloxane consisting essentially of (A) from 10 to 90 parts by weight of groups represented by the formula:

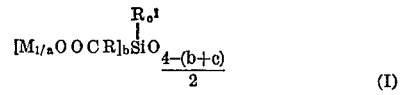

wherein M is a cation that imparts water and alcohol solubility to the siloxanes, said cation being selected from a group consisting of the sodium, potassium, lithium and rubidium cations and the tetraorgano ammonium cations, $a$ is the valence of the cation represented by M and has a value of at least one, R is a divalent hydrocarbon group containing from 0 to 1 $M_{1/a}OOC-$ groups as substituents, each $M_{1/a}OOC-$ group is connected to the silicon atom through at least 2 carbon atoms of the group represented by R, $R^1$ is a monovalent hydrocarbon group, $b$ has a value from 1 to 3 inclusive, $c$ has a value from 0 to 2 inclusive and $(b+c)$ has a value from 1 to 3 inclusive, and (B) from 10 to 90 parts by weight of groups represented by the formula:

wherein $R''$ is a monovalent hydrocarbon group containing from 0 to 1 amino groups as substituents and $e$ has a value from 1 to 3 inclusive, said siloxane being present in an amount from 0.1 part to 10 parts by weight per 100 parts by weight of the alcohol, said parts by weight of said groups being based on 100 parts by weight of the siloxane.

12. A single phase inhibited alcohol composition comprising a glycol, a silicon-free inorganic basic buffer, said buffer being present in an amount from 0.1 part to 10 parts by weight per 100 parts by weight of the glycol, and, as an inhibitor, a corrosion inhibiting amount of a water soluble and alcohol soluble siloxane consisting essentially of: (A) from 10 to 90 parts by weight of groups represented by the formula:

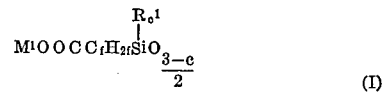

wherein $M^1$ is potassium, $f$ has a value of at least 2, $R^1$ is a monovalent hydrocarbon group, $c$ has a value from 0 to 2 inclusive and the $M^1OOC$ group is connected to the silicon atom through at least 2 carbon atoms of the group represented by $C_fH_{2f}$, and (B) from 10 to 90 parts by weight of groups represented by the formula:

wherein $R''$ is a monovalent hydrocarbon group containing from 0 to 1 amino groups as substituents and $e$ has a value from 1 to 3 inclusive, said parts by weight of said groups being based on 100 parts by weight of the siloxane, said siloxane being present in an amount from 0.1 part to 10 parts by weight per 100 parts by weight of the glycol.

13. A single phase inhibited ethylene glycol composition comprising ethylene glycol, from 0.1 to 10 parts by weight of a potassium borate per 100 parts by weight of the ethylene glycol, from 0 to 900 parts by weight of water per 100 parts by weight of the ethylene glycol, and, as an inhibitor, from 0.1 to 10 parts by weight per 100 parts by weight of the ethylene glycol of a water soluble and alcohol soluble siloxane consisting essentially of: (A) from 50 to 85 parts by weight per 100 parts by weight of the siloxane of groups represented by the formula:

$$KOOCCH_2CH_2SiO_{1.5}$$

and (B) from 15 to 50 parts by weight per 100 parts by weight of the siloxane of groups represented by the formula:

$$CH_2=CHSiO_{1.5}$$

14. An anhydrous mixture comprising (A) an alcohol, (B) a silane represented by the formula:

$$[Y'R''''_]_bSiX_{4-(b+c)}$$

wherein Y' is a member selected from the group consisting of the cyano and the $R^1OOC$— groups, $R''''$ is a divalent hydrocarbon group consisting from 0 to 1 groups represented by Y' as substituents, each group represented by Y' is separated from the silicon atom by at least two carbon atoms of the group represented by $R''''$, $R^1$ is a monovalent hydrocarbon group, X is a hydrocarbonoxy group, b has a value from 1 to 3 inclusive, c has a value from 0 to 2 inclusive and $(b+c)$ has a value from 1 to 3, inclusive, and (C) the hydroxide of a cation that imparts water and alcohol solubility to a siloxane consisting essentially of groups represented by the formula:

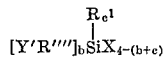
$$[M_{1/a}OOCR]_bSiO_{\frac{4-(b+c)}{2}}$$

where M is the cation having a valence of a, said cation being selected from a group consisting of the sodium, potassium, lithium and rubidium cations and the tetra-organo ammonium cations, R is a divalent hydrocarbon group containing from 0 to 1 $M_{1/a}OOC$— groups as substituents, and each $M_{1/a}OOC$— group is separated from the silicon atom by at least two carbon atoms of the group represented by R and $R^1$, b, c and $(b+c)$ have the above-defined meanings, (B) and (C) being present in an amount sufficient to react to produce from 0.1 to 10 parts by weight (per 100 parts by weight of the alcohol) of a siloxane as defined in claim 1.

15. A process for inhibiting the corrosion of metals below sodium in the electromotive series that come in contact with aqueous liquids, said process comprising adding to the liquid a member selected from the group consisting of:

(I) a water soluble and alcohol soluble siloxane consisting essentially of siloxane groups represented by the formula:

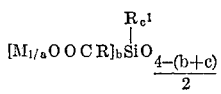
$$[M_{1/a}OOCR]_bSiO_{\frac{4-(b+c)}{2}}$$

wherein M is a cation that imparts water and alcohol solubility to the siloxane, said cation being selected from a group consisting of the sodium, potassium, lithium and rubidium cations and the tetraorgano ammonium cations, a is the valence of the cation represented by M and has a value of at least one, R is a divalent hydrocarbon group containing from 0 to 1 $M_{1/a}OOC$— groups as substituents, each $M_{1/a}OOC$— group is connected to the silicon atom through at least two carbon atoms of the group represented by R, $R^1$ is a monovalent hydrocarbon group, b has a value from 1 to 3 inclusive, C has a value from 0 to 2 inclusive and $(b+c)$ has a value from 1 to 3, inclusive, said siloxane being added in an amount from 0.1 to 10 parts by weight per 100 parts by weight of the aqueous liquid, and (II) a mixture capable of reacting with water to produce the siloxane, said mixture comprising (A) the hydroxide of the cation represented by M and (B) a silane represented by the formula:

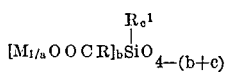
$$[Y'R''''_]_bSiX_{4-(b+c)}$$

wherein Y' is a member selected from the group consisting of the cyano and the $R^1OOC$— groups, $R''''$ is a divalent hydrocarbon group containing from 0 to 1 groups represented by Y' as substituents, each group represented by Y' is separated from the silicon atom by at least two carbon atoms of the group represented by $R''''$, $R^1$ is a monovalent hydrocarbon group, X is a hydrocarbonoxy group, b has a value from 1 to 3 inclusive, c has a value from 0 to 2 inclusive and $(b+c)$ has a value from 1 to 3 inclusive, said mixture being added in an amount sufficient to produce from 0.1 to 10 parts by weight of the siloxane per 100 parts by weight of the aqueous liquid.

16. A process for inhibiting the corrosion of metals below sodium in the electromotive series that come in contact with aqueous liquids, said process comprising adding to the liquid (I) from 0.1 part to 10 parts by weight per 100 parts by weight of the aqueous liquid of a water soluble and alcohol soluble siloxane consisting essentially of group represented by the formula:

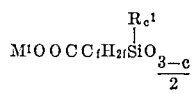
$$M^1OOCC_fH_{2f}SiO_{\frac{3-c}{2}}$$

wherein $M^1$ is potassium, f has a value of at least 2, $R^1$ is a monovalent hydrocarbon group, c has a value from 0 to 2, inclusive, and the $M^1OOC$— group is connected to the silicon atom through at least 2 carbon atoms of the group represented by $C_fH_{2f}$, and (II) from 0.1 to 10 parts by weight per 100 parts by weight of the aqueous liquid of a member selected from the group consisting of the sodium borates and the potassium borates.

17. A process for inhibiting the corrosion of metals below sodium in the electromotive series that come in contact with aqueous liquids, said process comprising adding to the liquid (I) from 0.1 to 10 parts by weight per 100 parts by weight of the aqueous liquid of a water soluble and alcohol soluble siloxane consisting essentially of (A) from 10 to 90 parts by weight of groups represented by the formula:

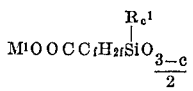
$$M^1OOCC_fH_{2f}SiO_{\frac{3-c}{2}}$$

wherein $M^1$ is potassium, f has a value of at least 2, $R^1$ is a monovalent hydrocarbon group, c has a value from 0 to 2, inclusive, and the $M^1OOC$— group is connected to the silicon atom through at least 2 carbon atoms of the group represented by $C_fH_{2f}$ and (B) from 10 to 90 parts by weight of siloxane groups represented by the formula:

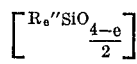
$$\left[R_e''SiO_{\frac{4-e}{2}}\right]$$

wherein $R''$ is a monovalent hydrocarbon group containing from 0 to 1 amino groups as substituents and e has a value from 1 to 3 inclusive, said parts by weight of said groups being based on 100 parts by weight of the siloxane, and (II) from 0.1 to 10 parts by weight per 100 parts by weight of the aqueous liquid of a member selected from the group consisting of the sodium borates and the potassium borates.

References Cited by the Examiner

UNITED STATES PATENTS

| | | | |
|---|---|---|---|
| 2,723,987 | 11/1955 | Speier | 260—46.5 |
| 2,770,632 | 11/1956 | Merker | 260—448.2 |
| 2,875,177 | 2/1959 | Bluestein | 260—448.2 |
| 2,937,146 | 5/1960 | Cutlip et al. | 252—75 |

ALBERT T. MEYERS, *Primary Examiner.*

JULIUS GREENWALD, *Examiner.*

J. E. MOERMOND, R. D. LOVERING,
*Assistant Examiners.*